United States Patent

Maughmer

[11] 4,166,406
[45] Sep. 4, 1979

[54] SELF-ALIGNING PITCH AND AZIMUTH REFERENCE UNIT

[75] Inventor: Robert W. Maughmer, Calabasas Park, Calif.

[73] Assignee: Litton Systems, Inc., Beverly Hills, Calif.

[21] Appl. No.: 830,467

[22] Filed: Sep. 6, 1977

[51] Int. Cl.$^2$ .............................................. F41G 3/22
[52] U.S. Cl. ...................................... 89/1.815; 73/504; 89/41 CE; 364/423; 364/426; 364/434; 364/454
[58] Field of Search ................... 73/504; 74/5.42, 5.44; 89/1.815, 41 CE, 41 T; 364/423, 424, 426, 434, 450, 453, 454, 460

[56] References Cited

U.S. PATENT DOCUMENTS

| 3,071,008 | 1/1963 | Steele | 73/504 |
| 3,127,774 | 4/1964 | Fischer et al. | 73/504 |
| 4,004,487 | 1/1977 | Eichweber | 89/1.815 |

Primary Examiner—Stephen C. Bentley
Attorney, Agent, or Firm—Harold E. Gillmann

[57] ABSTRACT

A system for determining orientation or position of a movable supporting structure, such as a vehicle, includes a special inertial sensor unit. This unit includes a single gyroscope hereinafter referred to as a "gyro", with its spin axis mounted in alignment with the sensitive axis of an accelerometer. The gyro and accelerometer are mounted pendulously to rotate only about a single axis which is aligned with a direction of travel of the vehicle or with a projectile launching assembly. In additon to being pendulously mounted as mentioned above, the gyro and accelerometer combination may be rotated relative to their pendulous support, to certain fixed positions, in order to facilitate rapid initial alignment and orientation and pre-mission calibration of the inertial instruments. The pendulously mounted unit is also provided with an optical encoder to indicate the roll angle of the vehicle to which the inertial unit is secured.

In an initial rapid alignment sequence after the unit is energized, the rotation of the earth is sensed and the information stored with the unit in two or three different orientations, and, using this stored information, and the stored accelerometer outputs, the azimuth of the pendulous axis relative to true north and its pitch or elevation angle may be accurately determined.

When mounted in a vehicle and used in combination with the output from the vehicle odometer, an accurate indication of the movement of the vehicle may be obtained, and when combined with initial position and orientation data, the position of the vehicle may be continuously determined.

12 Claims, 7 Drawing Figures

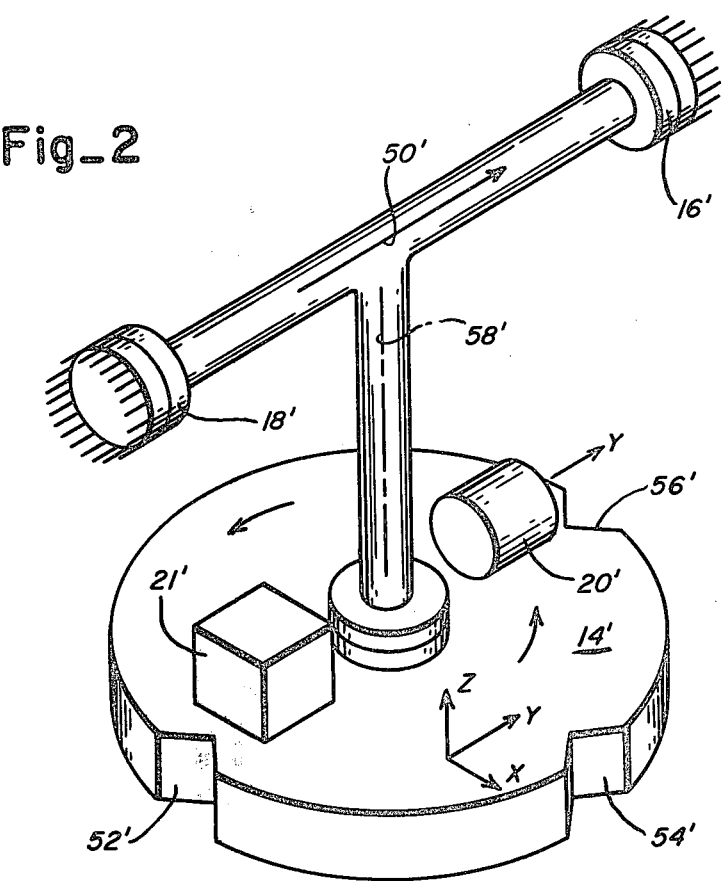
Fig_2
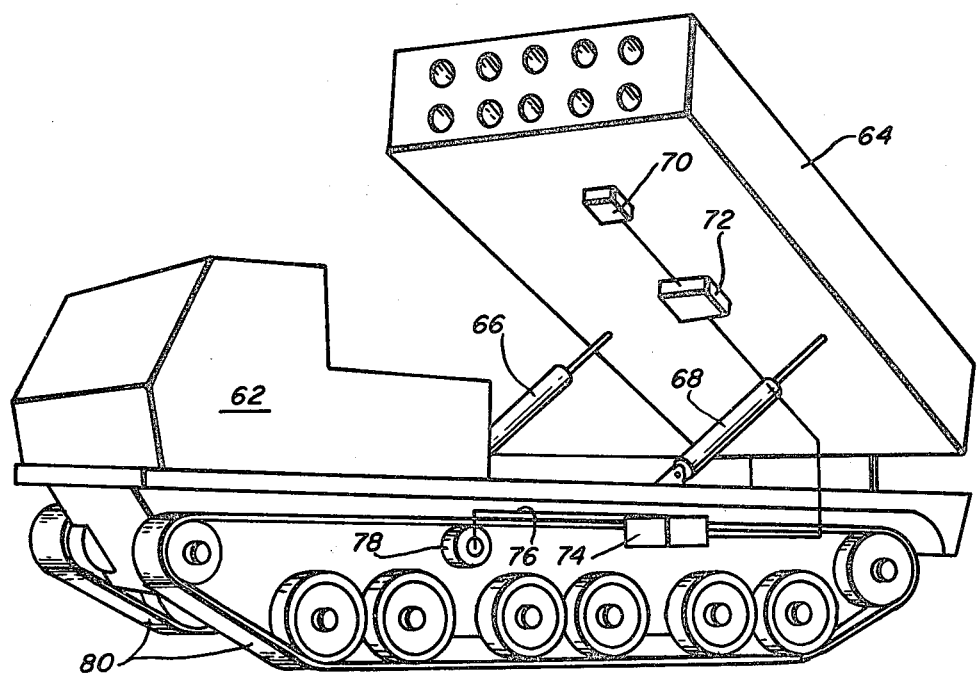
Fig_3

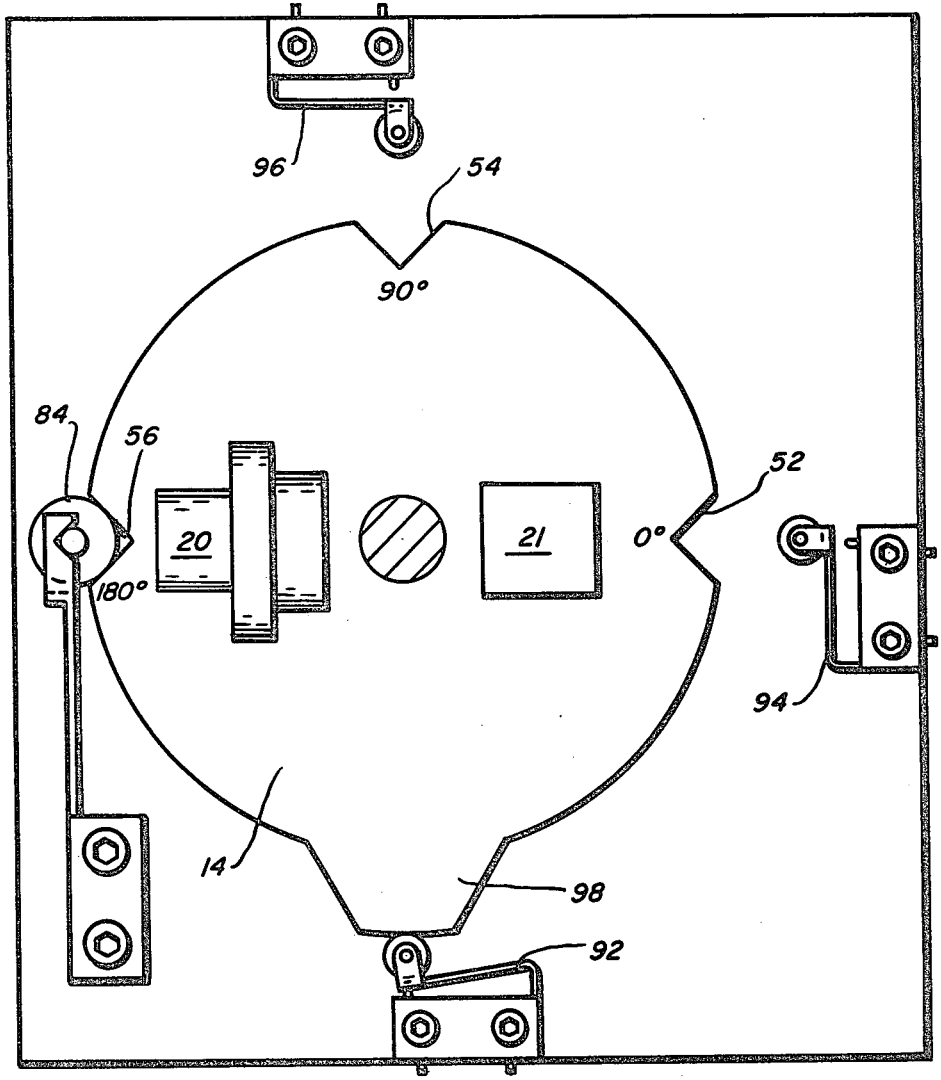
Fig_4
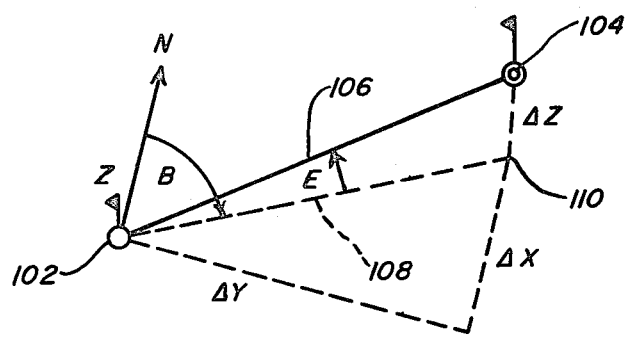
Fig_5

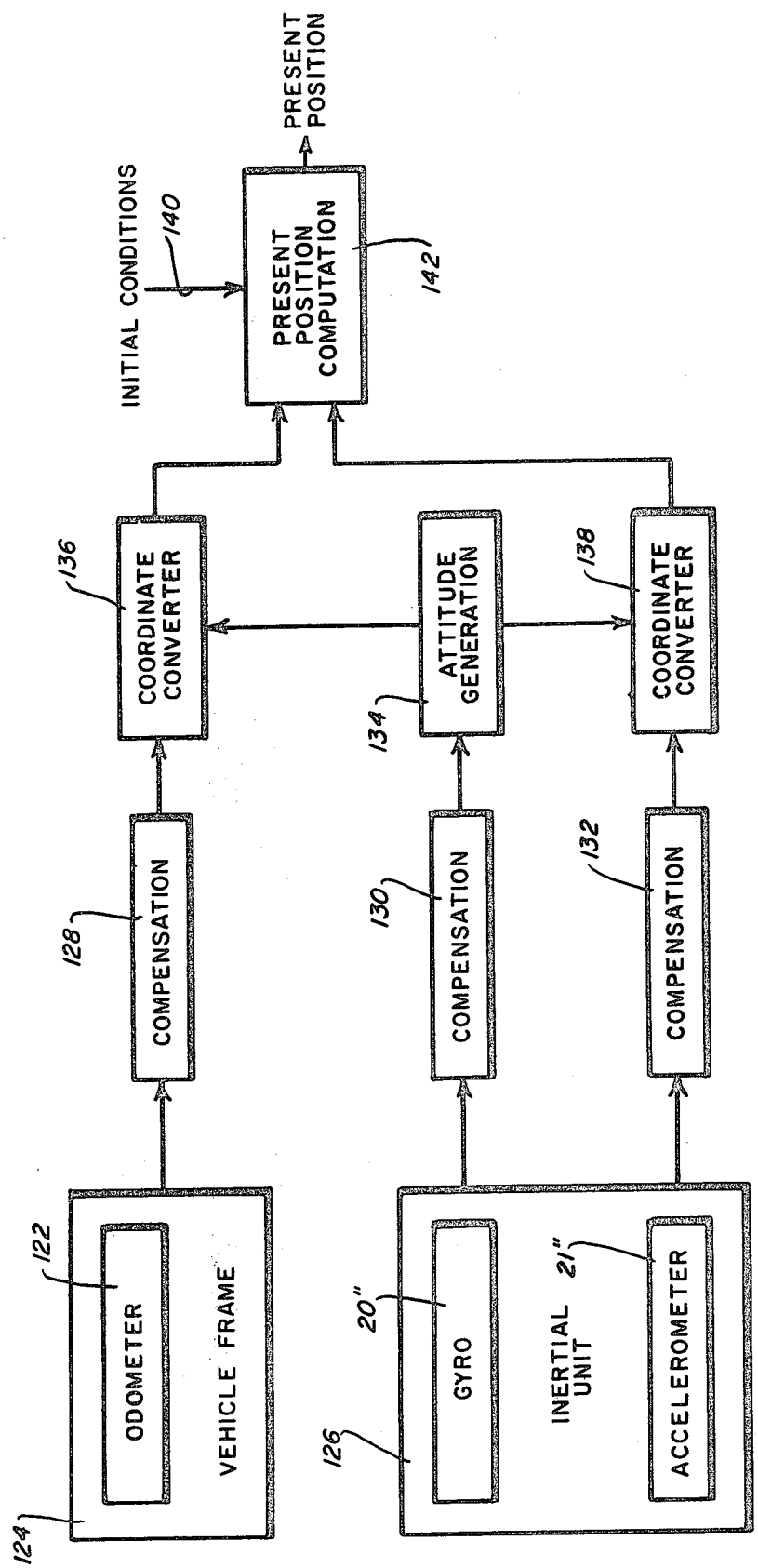
Fig_6

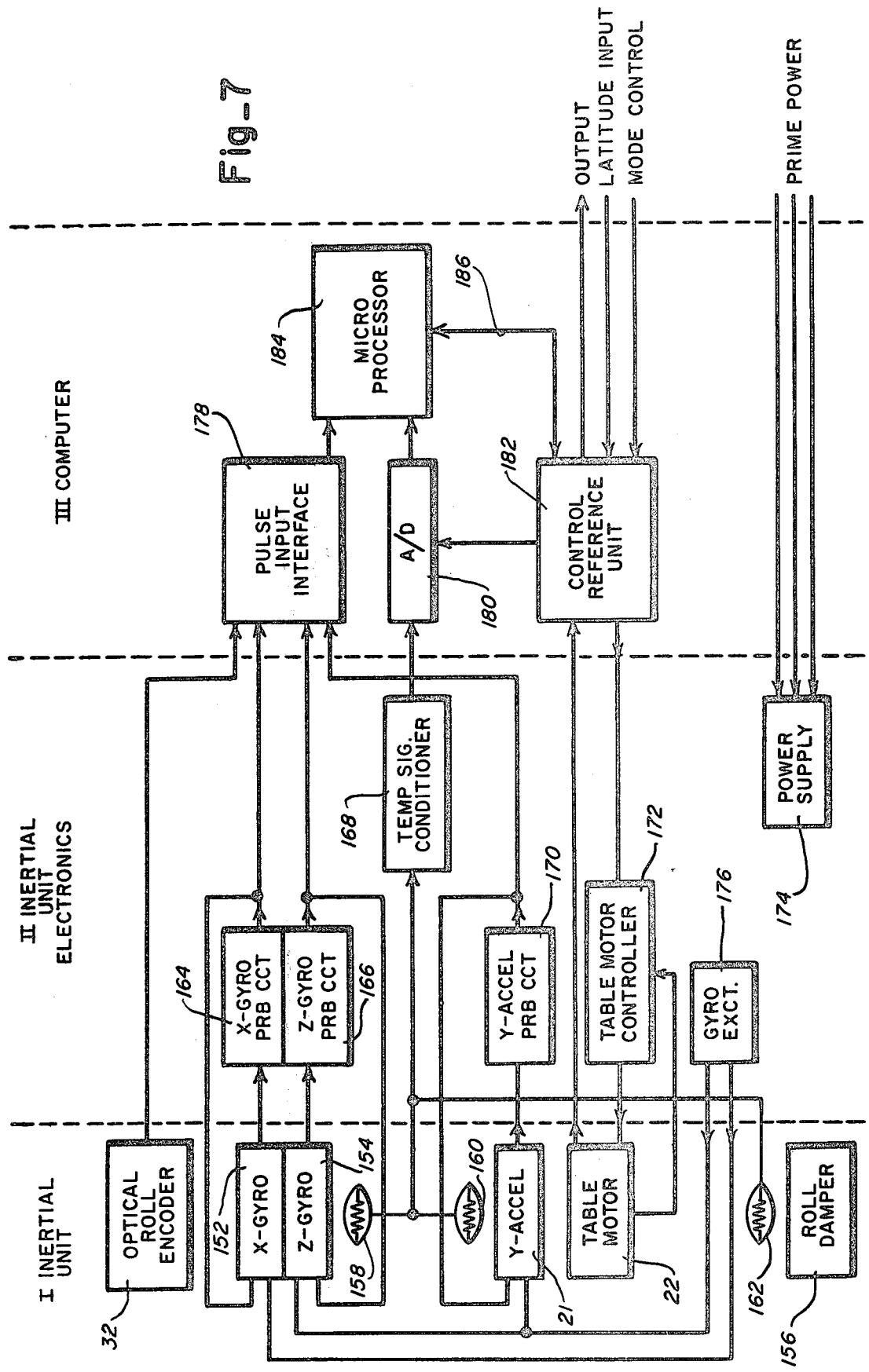

SELF-ALIGNING PITCH AND AZIMUTH REFERENCE UNIT

FIELD OF THE INVENTION

This invention relates to simplified inertial sensing units and to systems employing such units.

BACKGROUND OF THE INVENTION

With regard to the background of the present invention, complete inertial nevigation systems have been proposed for use on vehicles, as disclosed for example in U.S. Pat. application Ser. No. 749,356 (now U.S. Pat. No. 4,060,718 which issued Nov. 29, 1977) filed Dec. 10, 1976 and entitled, "Geodetic Survey Method," assigned to the assignee of this invention. In addition, of course, it has previously been proposed to use the odometer of a vehicle and successive compass readings when the vehicle makes turns to track the course of the vehicle.

Considering the second-mentioned system first, it is of course very crude and not easily employed under military field conditions or under other circumstances where accuracy and time constraints are significant factors. With regard to the use of complete inertial navigation systems involving two or three gyros and other associated equipment, such as those employed in commercial aircraft, they are relatively expensive and have a higher cost and greater accuracy than is justified for many applications.

Accordingly, a principal object of the present invention is to provide a simplified low-cost inertial sensor to provide pitch and heading references; and which is capable of rapid initial alignment.

Another object is to provide such a unit which, when used on a wheeled or tracked vehicle in combination with an odometer, will provide both the horizontal and the vertical position of the vehicle, as it travels.

BRIEF SUMMARY OF THE INVENTION

In accordance with a broad aspect of the invention, a vehicle or other movable object is provided with a simple inertial unit which is pendulously mounted from the vehicle to rotate about a single axis of interest, which could be the normal front-to-rear axis of travel of the vehicle. The inertial unit includes only a gyro and an accelerometer, and the gyro has its spin axis fixedly aligned with the sensitive axis of the accelerometer; and the gyro and accelerometer axes mentioned above are mounted parallel to the pendulous axis about which the inertial unit is suspended.

In accordance with a feature of the invention, the self-alignment procedure is facilitated by having the gyro and the accelerometer mounted together for angular displacement relative to the pendulous support into one or two additional accurately determined angular positions relative to its normal fixed position.

In accordance with another aspect of the invention, the pendulously mounted inertial unit may be provided with an angle encoder for indicating the roll or the tilt of the vehicle about the pendulous axis.

A subordinate feature of the invention involves the use of a damping mechanism to avoid violent swings of the pendulously supported inertial unit.

When used with a vehicle, the simplified inertial unit may be employed to initially calibrate the vehicle odometer, and thereafter the inertial unit and the odometer may be employed in combination to provide a continuous indication of the position of the vehicle relative to the starting point.

Suitable electronics compatible with the output of the inertial sensors may be employed (1) for the initial alignment procedure, (2) for continuously indicating pitch and alignment of the inertial unit, and (3) when employed with the odometer to provide suitable compensation for errors which might otherwise be introduced, and to combine the instantaneous position computation with the initial conditions to produce an output indication of the instantaneous position of the vehicle.

A particular advantage of the unit is its capacity for cancelling out undesired inertial instrument errors. Collateral advantages include the low cost and relative high accuracy of the system.

Other objects, features, and advantages of the invention will become apparent from a consideration of the following detailed description and from the accompanying drawings.

BRIEF DESCRIPTION OF THE DRAWINGS

FIG. 2 is a schematic showing of the unit of FIG. 1;

FIG. 3 illustrates one possible application for the inertial unit of FIG. 1;

FIG. 4 is a schematic showing of the mechanism employed to rotate the accelerometer and gyro of the assembly of FIG. 1 in the course of the initial alignment procedure;

FIG. 5 is a diagram illustrating the calibration procedure for the system when both the inertial unit and an odometer are used as inputs to the system;

FIG. 6 is a block diagram indicating the mode of operation of the system including the unit of FIG. 1;

FIG. 7 is a block diagram showing the components of the inertial unit and the associated circuitry.

DETAILED DESCRIPTION

Figure 1:
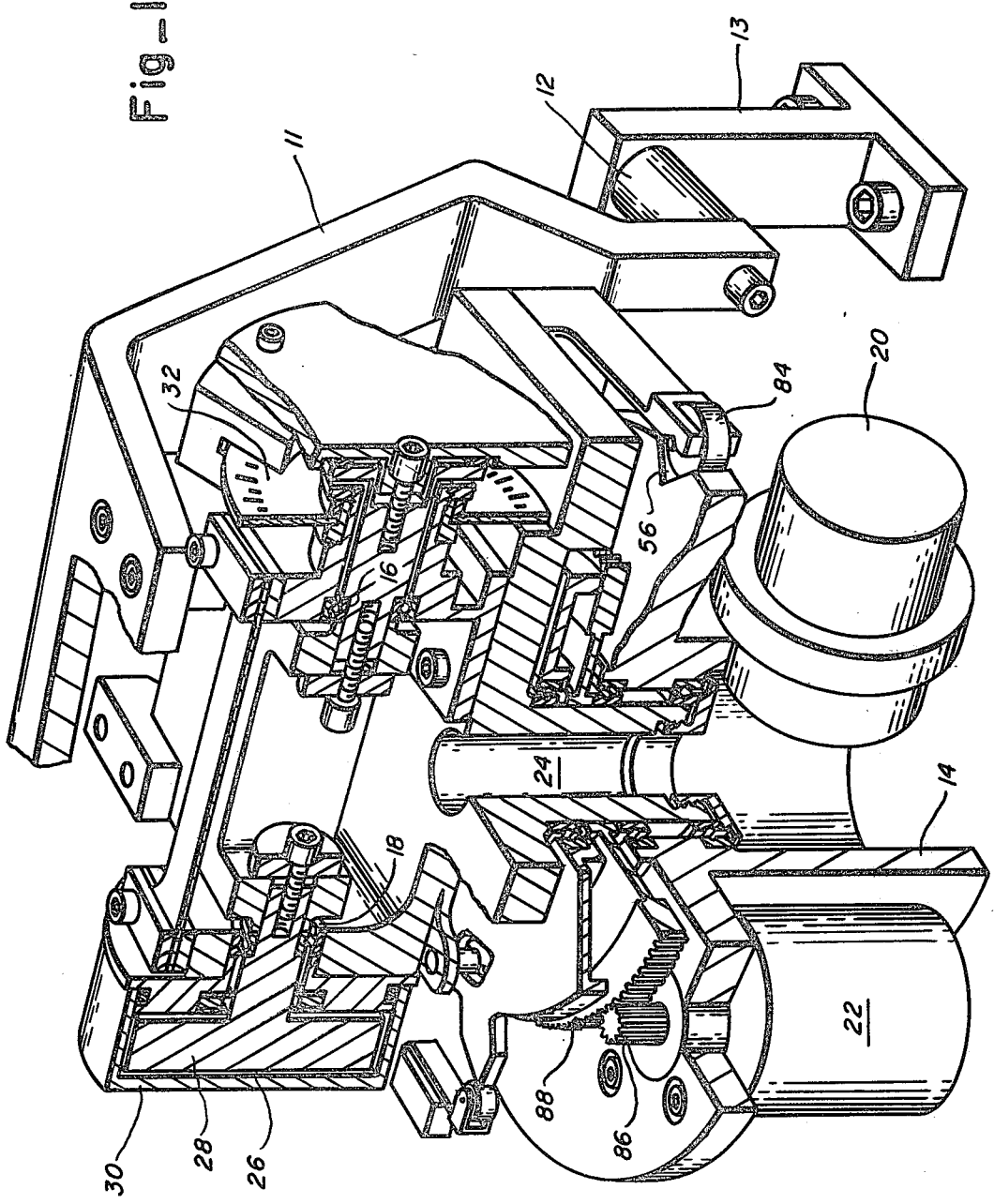
FIG. 1 is a partially broken away isometric view of a pendulously mounted inertial unit, illustrating the principles of the present invention.

Referring more particularly to the drawings, FIG. 1 shows the pendulous inertial unit illustrating the invention and its immediate support. In FIG. 1 the support 11 may for example be mounted through vibration isolator 12 to bracket 13 which is fixed to a vehicle or other movable member, the position of which is to be determined. A pendulous inertial assembly including the rotatable table 14 is supported from the frame member 11, penduluously, on bearings 16 and 18. Mounted on the rotatable table 14 are a gyro 20 which is a small "strap-down" two-degree of freedom gyro, an accelerometer (not shown in FIG. 1) mounted symmetrically about the axis of the rotatable table 14 with respect to gyro 20, and a drive motor 20 which serves to index the gyro and accelerometer support table 14 relative to the pendulous support 24 during initial alignment procedures.

A damping mechanism 26 which includes a generally cylindrical member 28 mounted within an oil-filled casing 30, serves to control angular motion of the pendulous assembly about bearings 16, 18, under shock or other conditions of high acceleration applied to the bracket 13.

An optical encoder assembly 32 may be provided to continuously monitor the angular position of the pendulous assembly 14 relative to the frame 11. In cases where the pendulous axis, as defined by bearings 16, 18 is aligned with the forward direction of travel of a vehicle, the encoder 32 would provide an indication of the side-to-side tilt, or the "roll" of the vehicle. The encoder assembly 32 may, for example, be an optical encoder from which either a unique signal pattern, or a series of pulses, are applied to electronic circuitry to continuously indicate the angular position of the encoding elements.

Before continuing with further description of FIG. 1, the schematic showing of FIG. 2 will be considered. In FIG. 2, reference numerals corresponding to those employed in FIG. 1 will be utilized; however, the showing is greatly simplified to emphasize the mode of operation of the unit rather than the actual physical construction. As may be seen in FIG. 2, the pendulous table 14' is constrained to hang down from and to rotate only about the pendulous axis indicated by arrow 50' which is aligned with bearings 16' and 18'. On the assembly 14', the gyro 20' has its spin axis aligned with the sensitive axis of the accelerometer 21', and these two axes are aligned with the pendulous axis 50' of the unit.

It is particularly to be noted that the pendulous axis will not be horizontal at all times; for example, when a vehicle is going uphill the pendulous axis 50' will also be directed at an angle somewhat above the horizontal and presumably approximately parallel to the angle of elevation of the road with respect to the horizontal.

For the purpose of considering the sensing capabilities of the gyro 20' and the accelerometer 21', the coordinate axes X, Y, and Z are shown superimposed on the pendulous table or assembly 14'. In FIG. 2 the spin axis of the gyro is in the "Y" direction. Accordingly, the gyro is capable of detecting rotation of the system about the X axis, and about the Z axis, with the X and Z axes both being perpendicular to the spin axis Y of gyro 20'. The accelerometer 21', on the other hand, senses accelerations having components in the Y direction. Of course, the gyro 20' is not responsive to movement in this direction.

In passing, it may be noted that with the pendulous axis 50' of the unit being held in alignment with the front-to-rear axis of a vehicle, the accelerometer 21' will measure the pitch angle of a vehicle, that is, whether it is pointing above or below the horizontal; azimuth or bearing and changes of azimuth or bearing are measured about the Z axis of the gyro. Rotation about the X axis corresponds to changes in the pitch of the vehicle, for example, as it goes over the top of a hill, and one of the two outputs from the two-degree-of-freedom gyro 20' provides this angular rotation information.

The notches 52, 54 and 56 are employed in connection with the initial alignment of the entire inertial sensor system, and position the circular portion of the pendulous assembly 14' as it is rotated to several discrete positions about the vertical axis 58', as will be discussed in greater detail below.

FIG. 3 is a schematic showing of an illustrative application for the pendulous inertial unit of the present invention. In FIG. 3, an armored vehicle 62 is equipped with a rocket-launching assembly 64. The rocket-launching assembly 64 is normally firmly in position against the main body of the armored vehicle 62; however, hydraulic units 66 and 68 are provided to raise the launcher assembly 64 to any desired angle of elevation. The vehicle 62 of FIG. 3 is provided with a pendulous inertial assembly 70, as described above in connection with FIGS. 1 and 2, and which is mounted on the rocket launcher 64. The pendulous inertial assembly 70 is provided with a local control and electronics unit 72 from which signals are sent to the central computer unit 74 located in the main portion of the armored vehicle. This main central computer and control unit 74 is provided with an input 76 which is connected to an idler wheel 78 or to another portion of the drive mechanism for the tracks 80 to provide an odometer indication of the distance travelled by the armored vehicle 62 and its rate of travel.

The pendulous inertial assembly 70 therefore provides information which is utilized in two different ways. When the vehicle is moving and the rocket launcher assembly 64 is clamped firmly down in place against the main portion of the body of the tracked vehicle 62, the pendulous axis of the inertial unit 70 is aligned with the normal front-to-rear direction of motion of the vehicle. When the vehicle is still, however, and the rocket launching assembly 64 is in the upward firing position, as shown in FIG. 3, the inertial unit 70 provides both initial azimuth and elevation information for orienting the unit, and also determines the changes which may occur following the firing of a salvo of rockets, for example, or of a settling of the heavy armored vehicle 62, when it is resting on soft ground.

The next matter to be considered is the initial alignment procedure which is employed to determine the direction in which the pendulous axis is pointing on the earth's surface. By way of background, it is well known that a gyroscope tends to remain in a fixed position in "inertial space", and can detect changes in position about its sensitive axes from its initial orientation in "inertial space". While it is conventional for persons to consider the earth to be our frame of reference, "inertial space" is determined by the position of the fixed stars in the sky, and of course our earth rotates nominally 360° every 24 hours. Accordingly, a gyroscope which senses changes in rotation relative to "inertial space" is rotated by nominally 15° every hour (actually 15.0412+ degrees) merely by the rotation of the earth on its axis. It may also be noted that, assuming a single gyroscope located on the equator of the earth, and having its spin axis pointed due north, there would be substantially no effect sensed by the gyroscope on account of the rotation of the earth, because the gyro would continue to point toward true north as the earth rotates. The alignment procedures to be developed more fully below utilize the factors outlined above to determine the exact angular orientation of the pendulous axis of the inertial cluster. In general, this procedure involves taking one measurement of the earth's rotation and other parameters with the gyro and accelerometer pointing in one direction and then rotating them relative to the pendulous assembly by 180°. In the present instance, where only one gyro is employed, a third angular orientation at 90°, half way between the two other positions, is advantageously employed, to improve sensitivity when the pendulous axis is oriented so that it is pointing east or west.

ALIGNMENT PROCEDURE

The steps and the related mathematical analysis involving the initial alignment procedure, and including determination of azimuth from the earth's rotation, will be set forth below. In the following analysis, Position A is the normally used position of the rotatable pendulous assembly 14 or 14' (see FIGS. 1 and 2) with the indexing roller 84 in notch 56. In Position B, the pendulous assembly 14' is rotated 180° so that notch 52' (see FIG. 2)

is engaged by detent 84. This rotation is accomplished by drive motor 22 which is mounted on the rotating table 14, and is provided with a small gear 86 which engages the larger gear 88 which is firmly secured to the central pendulous hub 24 which does not rotate with platform 14. The third Position C, 90° between positions A and B, is located by notch 54.

FIG. 4 shows rotatable table 14 together with the three notches 52, 54, and 56, and indexing roller 84. The three microswitches 92, 94 and 96 cooperate with cam 98 to indicate orientation of the table at the proper general angular orientation, with final positioning being accomplished by the indexing roller 84 engaging one of the notches. The microswitches control deenergization of the motor 22 when the proper approximate angular position is reached, and of course identify Positions A, B, or C to the system electronics.

Returning now to the mathematical analysis, the following symbols will be used, with the subscripts A, B, and C referring to measurements taken in positions A, B, and C, respectively, and the subscripts x, y, and z referring to the direction y and to rotations about the x and z axes. Other symbols which will be used include the following:

$\phi$ Latitude (an externally entered input to the system)
$\Omega$ Earth rate of rotation
$\omega$ Rate of rotation in radians per second
A Acceleration
$\psi$ Heading, or azimuth
$\epsilon_x$ Level Gyro Bias
V Accelerometer bias
$\Lambda$ Pitch, or upward or downward inclination of the pendulous axis.
$\epsilon_z$ Azimuth Gyro Bias Step 1—Position A Measure: Gyro $\omega_{XA}$, $\omega_{ZA}$
Accelerometer: $A_{YA}$ Step 2—Position B Measure: Gyro: $\omega_{XB}$, $\omega_{ZB}$
Accelerometer: $A_{YB}$ $$\psi = \text{SIN}^{-1} \frac{\omega_{XA} - \omega_{XB}}{2\Omega \text{COS}\phi} \quad (1)$$

If $\psi > 45°$, go to Position C $$\epsilon_x = \frac{\omega_{XA} + \omega_{XB}}{2} \quad (2)$$

$$\nabla = \frac{A_{YA} + A_{YB}}{2} \quad (3)$$

$$\theta = \text{SIN}^{-1} \frac{A_{YA} - A_{YB}}{2q} \quad (4)$$

$\epsilon_Z = \omega_{ZA} + \Omega(\text{COS}\phi \text{ SIN}\theta \text{ COS}\psi - \text{SIN}\phi \text{ COS}\theta)$ The torquer scale factor for the gyro z-axis is also calibrated as a result of this rotation through a known angle.

Step 3—Position C (use only if heading $\psi$ was within 45° of East or West:

Measure: Gyro: $\omega_{XC}$
Compute Heading:

$$\psi = \text{TAN}^{-1} - \frac{\omega_{XA} - \omega_{XB}}{(\omega_{XA} + \omega_{XB}) + 2\omega_{XC}} \quad (6)$$

Odometer Calibration Procedure

FIG. 5 is a diagram which is useful in describing the calibration procedure which is employed in connection with the odometer of the vehicle. In general, when the inertial package is employed in conjunction with the odometer, the pendulous axis of the inertial package is aligned with the front-to-rear forward direction of the vehicle. With regard to FIG. 3, this would be the case when the rocket launcher assembly 64 is in its lowered position and firmly mounted against the main body of the armored vehicle 62.

Now, with reference to FIG. 5, the vehicle is initially located at point 102 and is to be driven to point 104 along path 106. In FIG. 5 the horizontal line 108 is directly underneath the track 106, and the outer end 110 of horizontal line 108 is a distance $\Delta z$ below point 104.

In practice, the bearing B from true north to the plane defined by lines 106 and 108 is initially determined. In addition, the elevation angle E of point 104 from point 102 is found. After entering angles B and E, and following the initial alignment procedure for the system, the vehicle is driven from point 102 to point 104. Incidentally, the distance between point 102 and point 104 is preferably in the order of about 300 meters.

Following the traverse from point 102 to point 104, the reading on the odometer is taken, the distance traversed as indicated by the accelerometer is determined, and the outputs from the gyro are employed to calculate $\Delta X$, $\Delta Y$, and $\Delta Z$. Thereafter, the cross track misalignment angle, the elevation misalignment angle, and the odometer scale factor are determined in accordance with equations 7, 8, and 9 set forth below.

CROSSTRACK MISALIGNMENT ANGLE
$$\Delta B = B - \text{TAN}^{-1} \frac{\Delta Y}{\Delta X} \quad (7)$$
ELEVATION MISALIGNMENT ANGLE
$$\Delta E = E - \text{TAN}^{-1} \frac{\Delta Z}{\sqrt{\Delta X^2 + \Delta Y^2}} \quad (8)$$
ODOMETER SCALE FACTOR
$$S_O = S_A \left( \frac{\Delta X_O^2 + \Delta Y_O^2}{\Delta X_A^2 + \Delta Y_A^2} \right)^{\frac{1}{2}} \quad (9)$$

Where
B ... bearing from true north of point 104, measured at point 102.
$\Delta B$ ... cross track misalignment angle
$\Delta Y$ ... distance of point 104 east of point 102
$\Delta X$ ... distance of point 104 north of point 102
E ... the angle of elevation of the track above the horizontal
$\Delta E$ ... elevation misalignment angle
$\Delta Z$ ... distance of point 104 above point 102
$S_O$ ... odometer scale factor
$S_A$ ... accelerometer scale factor
$X_O$ ... the north distance calculated from odometer measurements.
$X_A$ ... the north distance calculated from accelerometer measurements.
$Y_O$ ... the East distance calculated from odometer measurements.
$Y_A$ ... the East distance calculated from accelerator measurements.

In the foregoing description, the pendulous inertial unit and one arrangement for mounting it on a movable member such as a vehicle have been described, together with both the initial alignment procedures for the unit per se and its subsequent calibration procedures when it is to be employed in combination with the output of a vehicle odometer. With regard to the accelerometer and gyro which are to be used on the inertial unit, any suitable strap-down gyro having two degrees of freedom, and any relatively high accuracy accelerometer, may be employed. In general, of course, from a performance standpoint, the higher the accuracy and the smaller the size of both the accelerometer and the gyro, the better. One suitable accelerometer which may be employed is disclosed in U.S. Pat. No. 3,498,138, granted Mar. 3, 1973. A suitable strap-down gyro having two degrees of freedom is disclosed in U.S. Pat. application Ser. No. 765,239 (now U.S. Pat. No. 4,123,849 which issued Nov. 7, 1978) filed Feb. 3, 1967 and entitled, "Miniature North Reference Unit." The above patent application is also of interest in going into mathematics and associated circuitry for this type of gyro unit.

Returning to a description of the drawings, FIG. 6 is a block function diagram in which inputs are received from the odometer 122 which is mounted on the frame 124 of a vehicle, and the gyro 20'' and accelerometer 21'' which form part of the inertial unit 126. The next step in processing the data from odometer 122, gyro 20'' and accelerator 21'' is the introduction of compensation, in accordance with the mathematical relationships set forth above, and this function is indicated by blocks 128, 130 and 132 in FIG. 6. The gyro signals are then converted into signals indicating the azimuth, elevation, and an indication of roll. This function is indicated by the block 134 designated "attitude generation" in FIG. 6. Using the attitude information and the inputs from the odometer and the accelerometer, which provide distance information, the next function is to convert the distance information obtained from the odometer and the accelerometer into standard coordinates of latitude and longitude or Universal Transverse Mercator Northings and Eastings (a universal military grid system), relating to north/south and east/west directions. This function is indicated by blocks 136 and 138. With initial conditions including both position and attitude supplied on input 140 the function of determining the present position is indicated by block 142, and suitable display or electrical output signals are presented to indicate the current position of the vehicle.

FIG. 6 as described above is a functional schematic block diagram indicating the mode of operation when both the odometer and the inertial unit are employed. FIG. 7 as set forth below is a schematic block diagram of the inertial unit and associated circuitry which includes three principal sections divided by the vertical dashed lines. From left to right, these three sections are I—The Inertial Unit, II—The Inertial Unit Electronics, and III—The Computer.

Considering first the inertial unit, it includes the optical roll encoder 32, the gyro unit which includes only a single gyro, but which is shown in terms of the two axes about which the gyro is sensitive, and is therefore specifically designated in terms of the adjacent blocks 152 and 154, corresponding to the X gyro output signal and the Z gyro output signal, respectively. The accelerometer block 21 is designated "Y-ACCEL." to indicate that it is sensitive in the Y axis direction which is of course aligned with the pendulous axis of the inertial unit, as discussed in connection with FIG. 2 hereinabove, for example. Table motor 22 is also included in the left-hand section designated "I—Inertial Unit". It may be recalled that the motor 22 drives the rotatable pendulous table 14' on which the accelerometer and the gyro are securely mounted, in the course of the initial alignment procedure. The roll damper 156 as shown in FIG. 7 refers to the portion of the assembly of FIG. 1 which was referenced by numerals 26, 28 and 30. The temperatures of the gyro, accelerometer, and roll damper are sensed by the resistors 158, 160 and 162, respectively.

Switching over to Section II., the Inertial Unit Electronics, it includes the X gyro pulse rebalancing circuit 164, the Z gyro pulse rebalancing circuit 166, the temperature signal conditioner circuit 168, the Y accelerometer pulse rebalancing circuit 170 and the table motor controller 172. The power supply for the driving and energization of the inertial unit is indicated by block 174. The source of power for gyro excitation and drive of the spin motor for the gyro is indicated by block 176.

Turning now to the right-hand section designated "III Computer," it includes the pulse output interface circuit 178, the analog-to-digital converter 180, and the control reference unit 182, which includes the input-output interface circuitry. The microprocessor 184 is connected by the bus 186 to receive signals from and to transmit information to the control reference unit 182. Inputs to the control reference unit 182 include a latitude input, and the "mode control" input which is employed to control the initial alignment, the calibration, or the normal operation of the entire system.

It is particularly to be noted that the functional diagram of FIG. 6 and the block diagram of FIG. 7 are merely illustrative circuits which show how the present inertial unit may be incorporated into various systems. When other forms of strap-down gyros or accelerometers are employed, of course, electronics compatible with such gyros and accelerometers would be employed.

For completeness, certain mathematical analyses are set forth below that are useful in limiting errors which might otherwise adversely affect the operation of systems of the present invention.

First, corrections for pendulum swing due to accelerations during vehicular travels must be made in order to avoid the large source of error which could arise from the centrifugal acceleration during a sustained vehicle turn. However, with information from the odometer, this potential source of error may be corrected.

From the well-known relationship $$\vec{a} = \vec{\omega} \times \vec{v} \qquad (10)$$

in vector notation, or $$a_x = \hat{\omega}_z v_y \qquad (11)$$

where:

$a_x$ = acceleration due to centrifugal force
$\hat{\omega}_z$ = vehicle turn rate (measured by the gyro z-axis)
$v_y$ = vehicle forward velocity A measure of $v_y$ is supplied by the odometer and $\hat{\omega}_z$ by one sensitive axis of the gyro. Having calculated the acceleration $a_x$, the angle $\Gamma_p$ at which the pendulum had been displaced is readily determined from the following expression:

$$(a_x/g) = \Gamma_p \qquad (12)$$

where g is the earth's gravitational constant ≈32.2 ft./sec.²

The accelerometer may be used during travel to bound the pitch error, and to continuously adjust the odometer scale factor to account for changing road conditions, or the like.

Since the system's pitch orientation $\theta$ is determined by mathematically integrating the output from the x-axis of the gyro, errors such as that due to gyro bias drift will increase with time.

$$\theta(t) = \theta_o + \int_o^t (\hat{\omega}_x(t))dt \tag{13}$$

where $\hat{\omega}_x$ is the angular rate of rotation measured by the x-axis of the gyro (see FIG. 2).

But, the accelerometer also provides a measure of the angle $\theta(t)$ relative to the earth's gravity vector g:

$$\hat{a}_y/g = \theta \tag{14}$$

By appropriately smoothing or averaging the acceleration readings, an independent measure of $\theta$ can be made, thereby bounding the pitch error of the system to a value determined by the accelerometer bias error.

As the wheeled or tracked vehicle moves over different terrain, the amount of slip of the wheels changes, thereby effectively changing the scale factor of the odometer. The accelerometer may be used to detect and correct for this changing scale factor in the following general manner:

The estimate of change in velocity $\Delta \tilde{v}_o$ over a short time interval as measured by the odometer may be represented as follows:

$$\Delta \tilde{v}_o = S_o \Delta \hat{V}_o \tag{15}$$

where $S_o$ is the odometer scale factor, $\Delta \hat{V}_o$ is the odometer measured velocity change, and $\Delta \tilde{v}_o$ is the estimated velocity change indicated by using the scale factor estimate, $S_o$.

The estimate of change in velocity as measured by the accelerometer over the same time interval is:

$$\Delta \tilde{v}_o = S_a \int_{t_o}^t \hat{a}_y dt - \int_{t_o}^t g\theta dt \tag{16}$$

where $g\theta$ is the correction of acceleration for pitch angle to eliminate the gravity factor;

$\hat{a}_y$ is the measured acceleration in the forward direction of the vehicle; and $S_a$ is the accelerometer scale factor.

Equating these two equations and solving for the new estimate $\tilde{S}_o$:

$$\tilde{S}_o = \frac{S_a \int_{t_o}^t \hat{a}_y dt - \int_{t_o}^t g\theta dt}{\Delta \hat{V}_o} \tag{17}$$

Using the relationship of Equation (17), a continuously updated value for the odometer scale factor is obtained.

Summarizing the features provided by the pendulous axis arrangements of the present invention, they tend to maintain the gyro z-axis (see FIG. 2) in a plane parallel to the gravity vector, and the gyro x-axis horizontal. In addition, the configuration tends to decouple the vehicle roll rates from the instrument cluster. These features permit reducing the inertial instrument complement from a full inertial guidance strap-down configuration (two two-degree of freedom gyros and 3 accelerometers) to the present one gyro, one accelerometer configuration.

In conclusion, the pendulous inertial unit of the present invention used with the vehicle odometer constitutes an inexpensive and relatively accurate position and orientation determining unit which is self-contained, does not require external radio or other inputs, and which is not subject to jamming. The disclosed geometry is helpful in eliminating errors which would otherwise decrease the accuracy of the system. It is to be understood that other gyros, such as nuclear magnetic resonance, or laser gyros, could be substituted for the two degree of freedom strap-down gyro disclosed hereinabove, and that alternative mechanical arrangements could be employed in implementing the disclosed functions.

What is claimed is:

1. A system for determining orientation or position comprising:

movable means having a principal direction of interest;

an instrument assembly including an accelerometer having its sensitive axis aligned with said principal direction and a two-degree-of-freedom gyro having its spin axis fixedly aligned with the sensitive axis of said accelerometer; and support means for pendulously mounting said instrument assembly to said movable means for pendulous rotation only about an axis aligned with said principal direction of interest.

2. A system as defined in claim 1 wherein said movable means is a vehicle, and wherein said principal direction of interest is the front-to-rear axis of motion of the vehicle.

3. A system as defined in claim 1 further comprising: angular encoding means for providing an indication of the orientation of said pendulous instrument assembly relative to said movable means.

4. A system as defined in claim 1 wherein means are provided for producing first and second output signals from said gyro indicating rotation about each of two axes which are mutually orthogonal with respect to each other and with said principal direction of interest, and with one of said two axes being horizontal.

5. A system for determining orientation or position comprising:

a projectile launching assembly having a principal direction of interest in the direction in which projectiles are to be launched;

an instrument assembly including an accelerometer having its sensitive axis aligned with said principal direction and a two degree of freedom gyro having its spin axis fixedly aligned with the sensitive axis of said accelerometer; and support means for pendulously mounting said instrument assembly to said projectile launching assembly for pendulous rotation only about an axis aligned with said principal direction of interest.

6. A system as defined in claim 5 further comprising: a vehicle supporting said projectile launching assembly, and means for normally supporting said projectile launching assembly with the projectile launching direction aligned with the normal front-to-rear axis of motion of said vehicle.

7. A system for determining orientation or position comprising:
movable means having a principal direction of interest;
an instrument assembly consisting solely of an accelerometer having its sensitive axis aligned with said principal direction, and a two degree of freedom gyro having its spin axis fixedly aligned with the sensitive axis of said accelerometer; and
support means for pendulously mounting said assembly to said movable means for pendulous rotation only about an axis aligned with said principal direction of interest.

8. A system for determining orientation or position comprising:
movable means having a principal direction of interest:
an instrument assembly including an accelerometer having a sensitive axis and a two degree of freedom gyro having its spin axis fixedly aligned with the sensitive axis of said accelerometer;
support means for pendulously mounting said assembly to said movable means for pendulous rotation only about an axis aligned with said principal direction of interest, with the spin axis of the said gyro and the sensitive axis of the said accelerometer aligned with said principal direction of interest; and
means for mechanically rotating said gyro and accelerometer successively to a plurality of fixed discrete angular positions about an axis perpendicular to said principal direction of interest.

9. A system as defined in claim 7 wherein said means for mechanically rotating said gyro and said accelerometer includes means for initially reversing their orientation by rotation through 180°, and subsequently rotating to an intermediate position by rotation through 90° if the principal direction of interest is within 45° of true east or true west.

10. A system for determining orientation or position comprising:
a vehicle having a principal direction of interest in the direction of the front-to-rear axis of motion of said vehicle;
an instrument assembly including an accelerometer having its sensitive axis aligned with said principal direction and a two degree of freedom gyro having a spin axis fixedly aligned with the sensitive axis of said accelerometer;
support means for pendulously mounting said assembly to said movable means for pendulous rotation only about an axis aligned with said principal direction of interest;
odometer means operatively mounted in said vehicle of indicating forward movement of said vehicle; and
means for receiving data from said gyro, said accelerometer and said odometer for indicating the position of said vehicle.

11. Apparatus as recited in claim 10 in which said means for receiving data includes:
an attitude generator, including signal compensation means, connected to receive and compensate information of the angular rate about two axes normal to said principal direction from said gyro and to calculate and indicate the azimuth, elevation and roll angles of said vehicle.

12. Apparatus as recited in claim 11 in which said means for receiving data further includes:
compensation means connected to compensate the signals from said accelerometer and said odometer;
coordinate converter means connected to receive altitude signals from said attitude generator and compensated acceleration and odometer signals from said compensation means to generate coordinate converted acceleration and odometer signals; and
a present position computer connected to receive initial condition signals and said coordinate converted acceleration and odometer signals to calculate the present position of said vehicle.

* * * * *